United States Patent
Bae

(10) Patent No.: US 11,550,300 B2
(45) Date of Patent: Jan. 10, 2023

(54) CLOTHING MANAGEMENT USING MOVING HANGER

(71) Applicant: LG ELECTRONICS INC., Seoul (KR)

(72) Inventor: Suman Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 279 days.

(21) Appl. No.: 17/067,004

(22) Filed: Oct. 9, 2020

(65) Prior Publication Data
US 2021/0132584 A1    May 6, 2021

(30) Foreign Application Priority Data
Nov. 1, 2019   (KR) .................. 10-2019-0138529

(51) Int. Cl.
*G05B 13/02*   (2006.01)
*G05B 19/416*  (2006.01)
*G06N 3/08*    (2006.01)
*H02P 23/00*   (2016.01)

(52) U.S. Cl.
CPC .............. *G05B 19/416* (2013.01); *G06N 3/08* (2013.01); *G05B 2219/42237* (2013.01); *H02P 23/0022* (2013.01)

(58) Field of Classification Search
CPC .............. H02P 23/0022; G05B 19/416; G05B 2219/42237; G06N 3/08
See application file for complete search history.

(56) References Cited

PUBLICATIONS

Arai et al, CN 100417004, "Motor Control Apparatus and Washing Machine and Dryer Using the Same" (translation), Sep. 3, 2008, 13 pgs <CN_100417004.pdf>.*
Fu et al, CN 110134047, "Drying Method, Device and Storage Medium" (translation), Aug. 16, 2019, 25 pgs <CN_110134047.pdf>.*
Zeitler et al, ES 2342398 T3, "Conveyor with Probability Estimator" (translation), Jul. 6, 2010, 24 pgs <ES_2342398T3.pdf>.*
Kukino et al, JP 2005034224, "Washing and Drying Machine, and Drying Method For Washing and Drying Machine" (translation), Feb. 10, 2005, 19 pgs <JP_2005034224.pdf>.*
Cella et al, CA 3082398 A1, "Methods and Systems For the Industrial Internet of Things" or WO 2019/094721, May 16, 2019, 349 pgs <CA_3082398.pdf>.*

* cited by examiner

*Primary Examiner* — Tuan A Vu
(74) *Attorney, Agent, or Firm* — Birch, Stewart, Kolasch & Birch, LLP

(57) ABSTRACT

A clothing management using a moving hanger is provided. A method of controlling a clothing styler according to an embodiment of the present disclosure determines a weight of clothing using a current RPM (cRPM) determined based on a PWM value provided to a motor and a prediction model based on the pre-trained artificial neural and may perform a suitable control operation according to the determined weight. The clothing styler of the present disclosure may be associated with an artificial intelligence module, an unmanned aerial vehicle (UAV), a robot, an augmented reality (AR) device, a virtual reality (VR) device, and a device related to a 5G service.

20 Claims, 14 Drawing Sheets

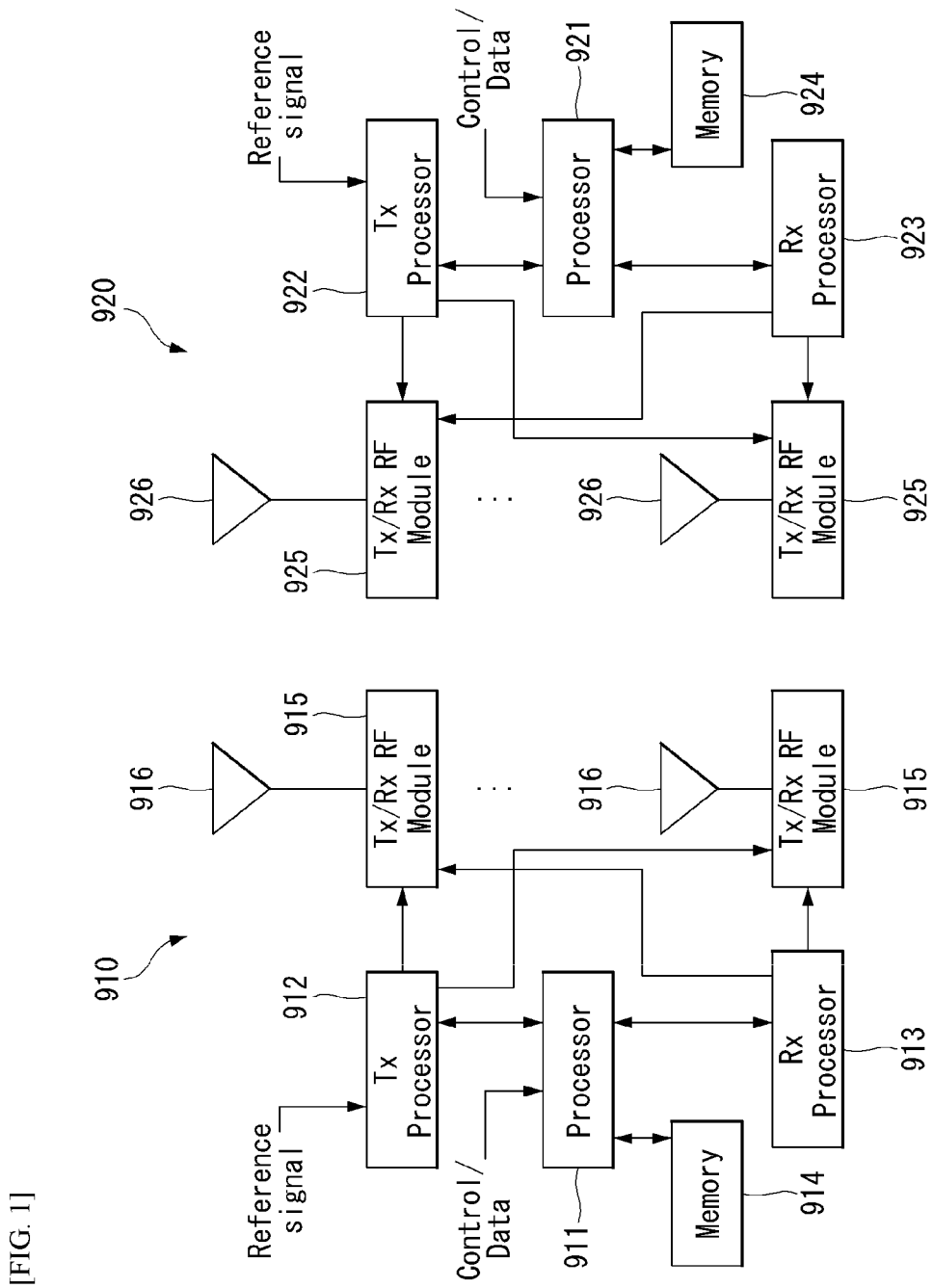
[FIG. 1]

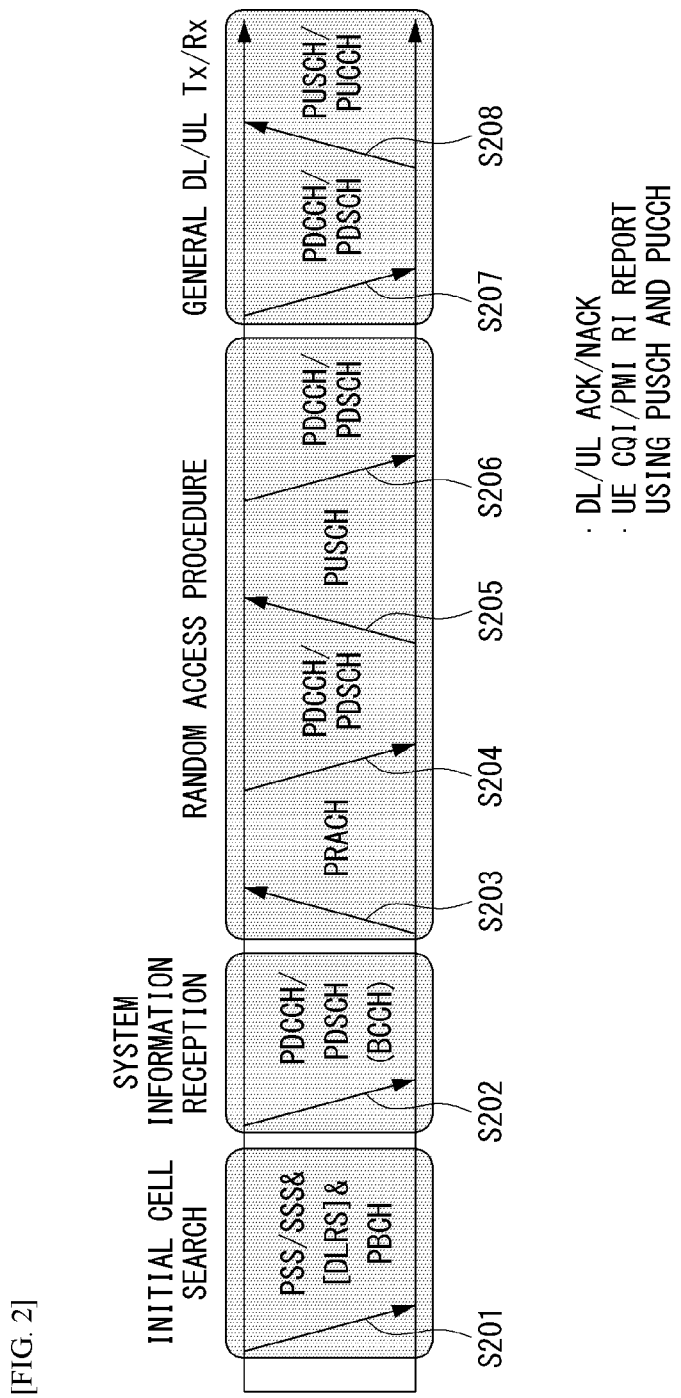
[FIG. 2]

[FIG. 3]
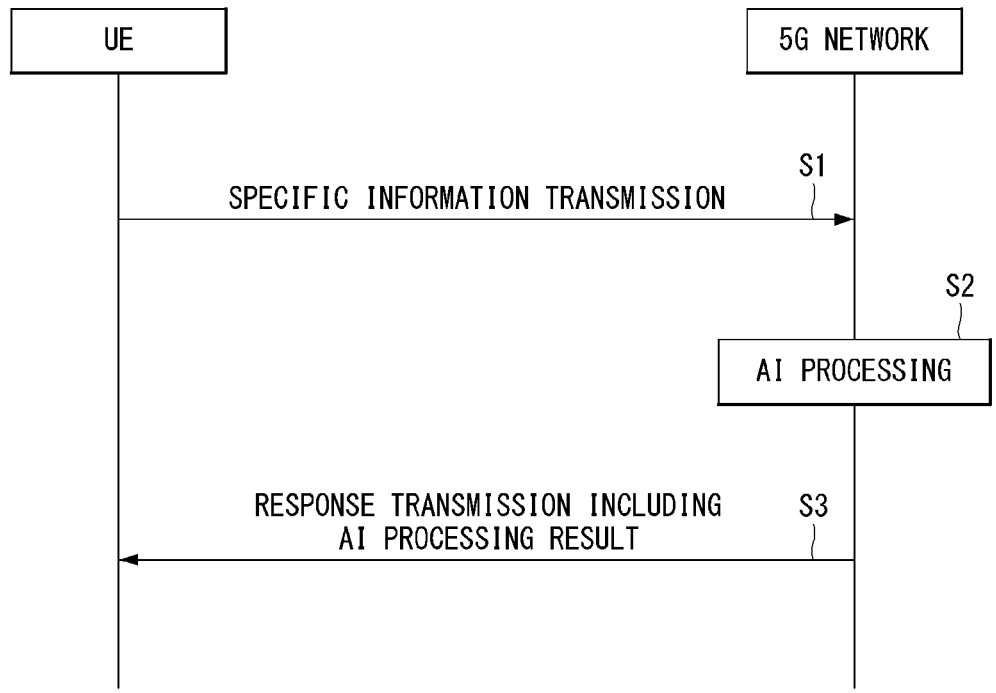
[FIG. 4]
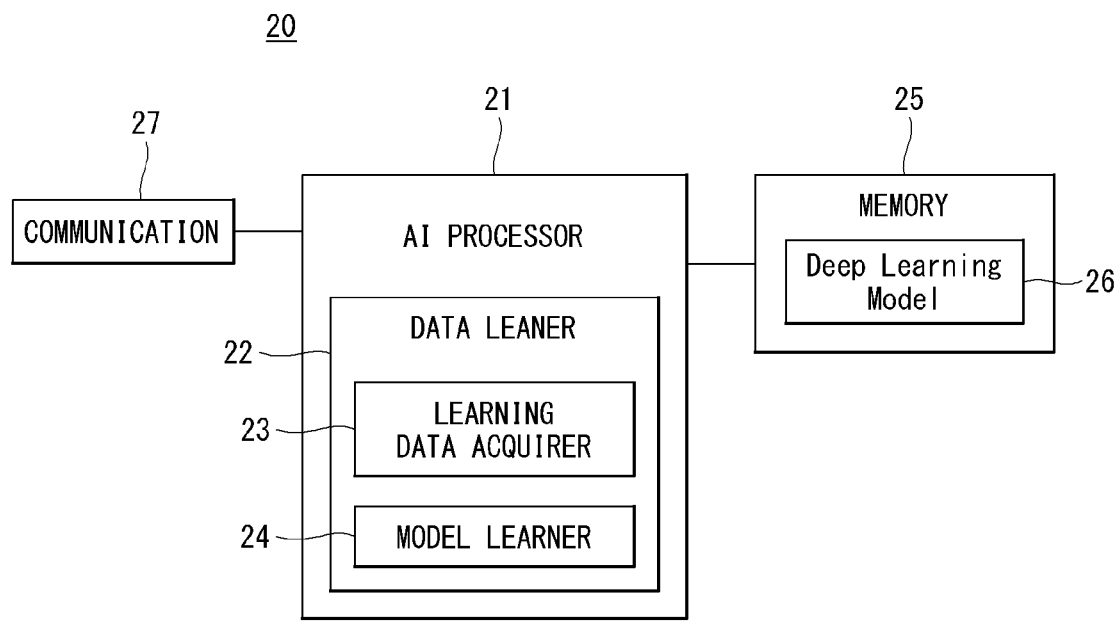

[FIG. 5]
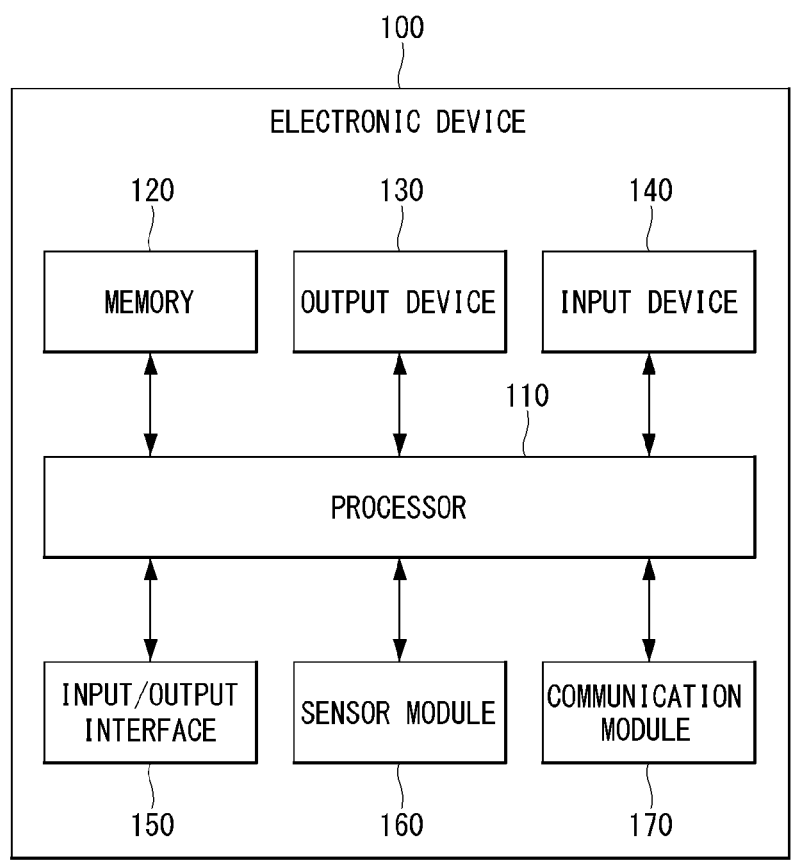

[FIG. 6]
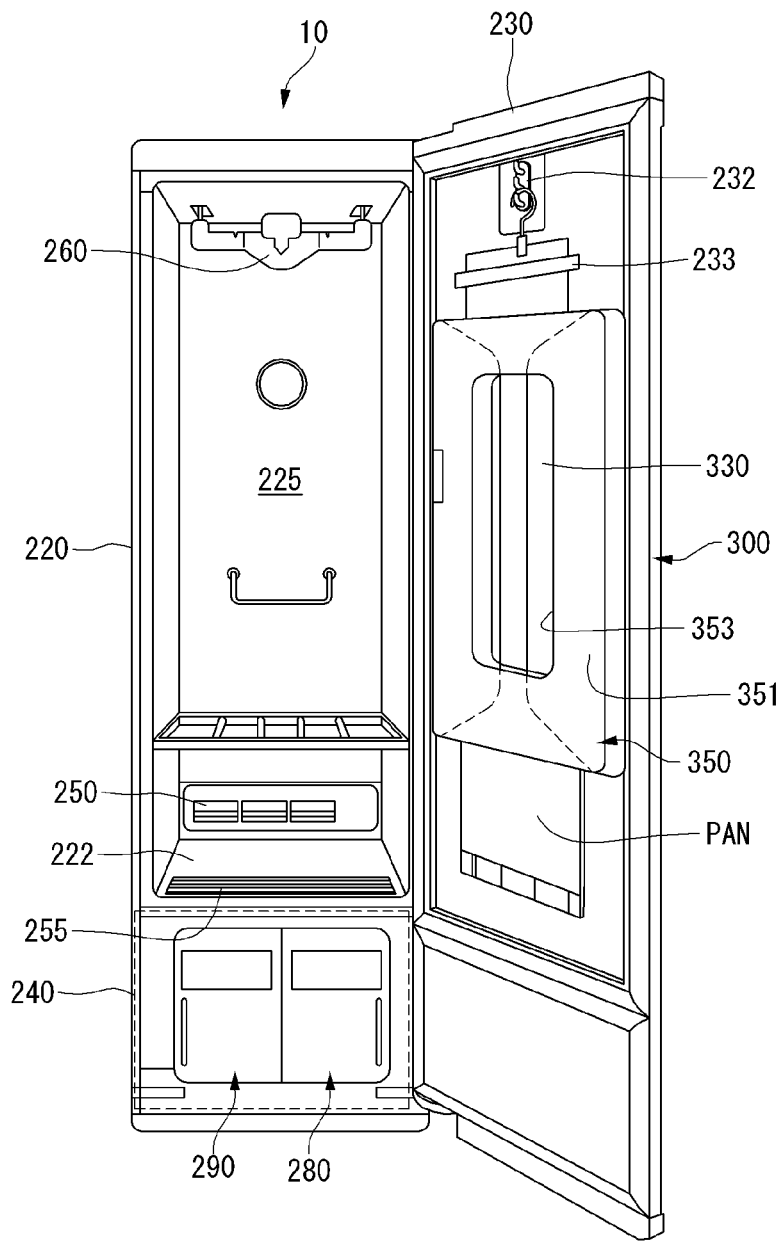

[FIG. 7]
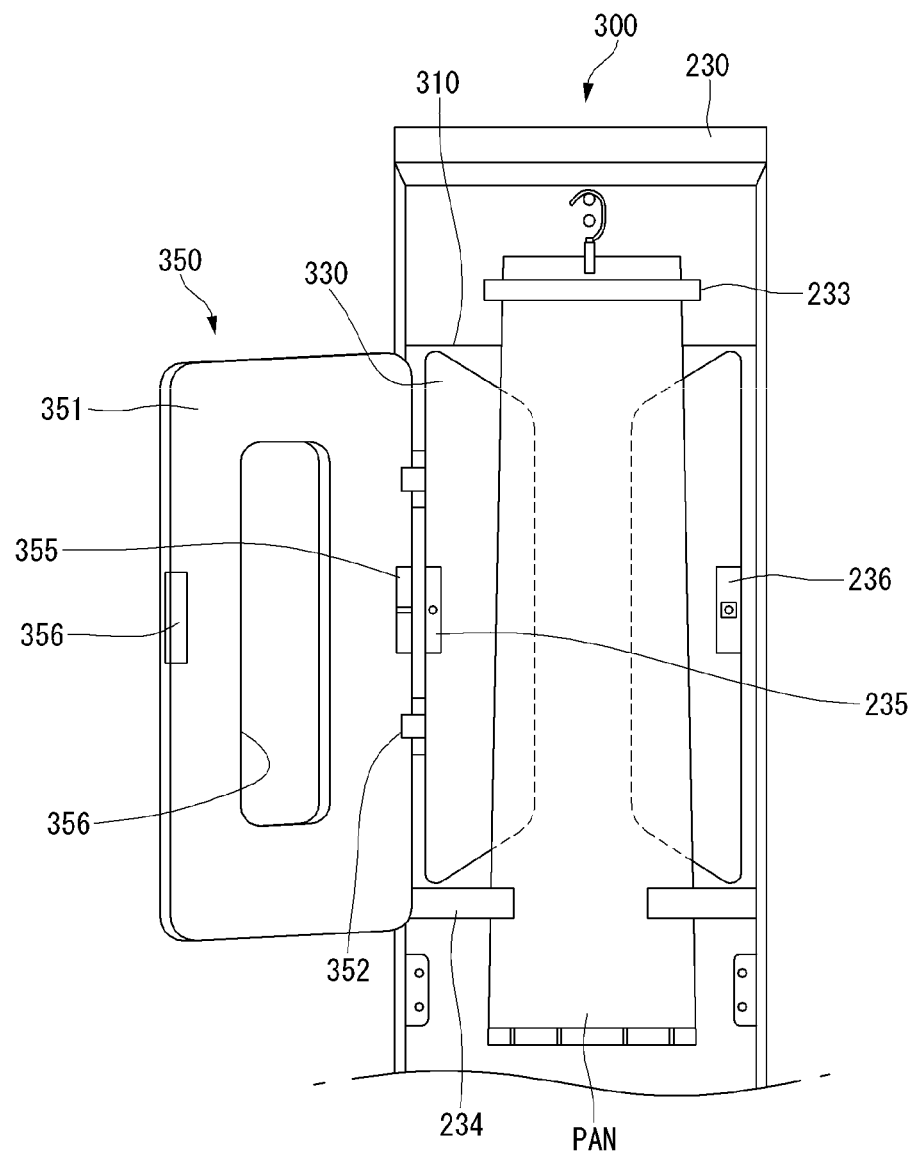

[FIG. 8]
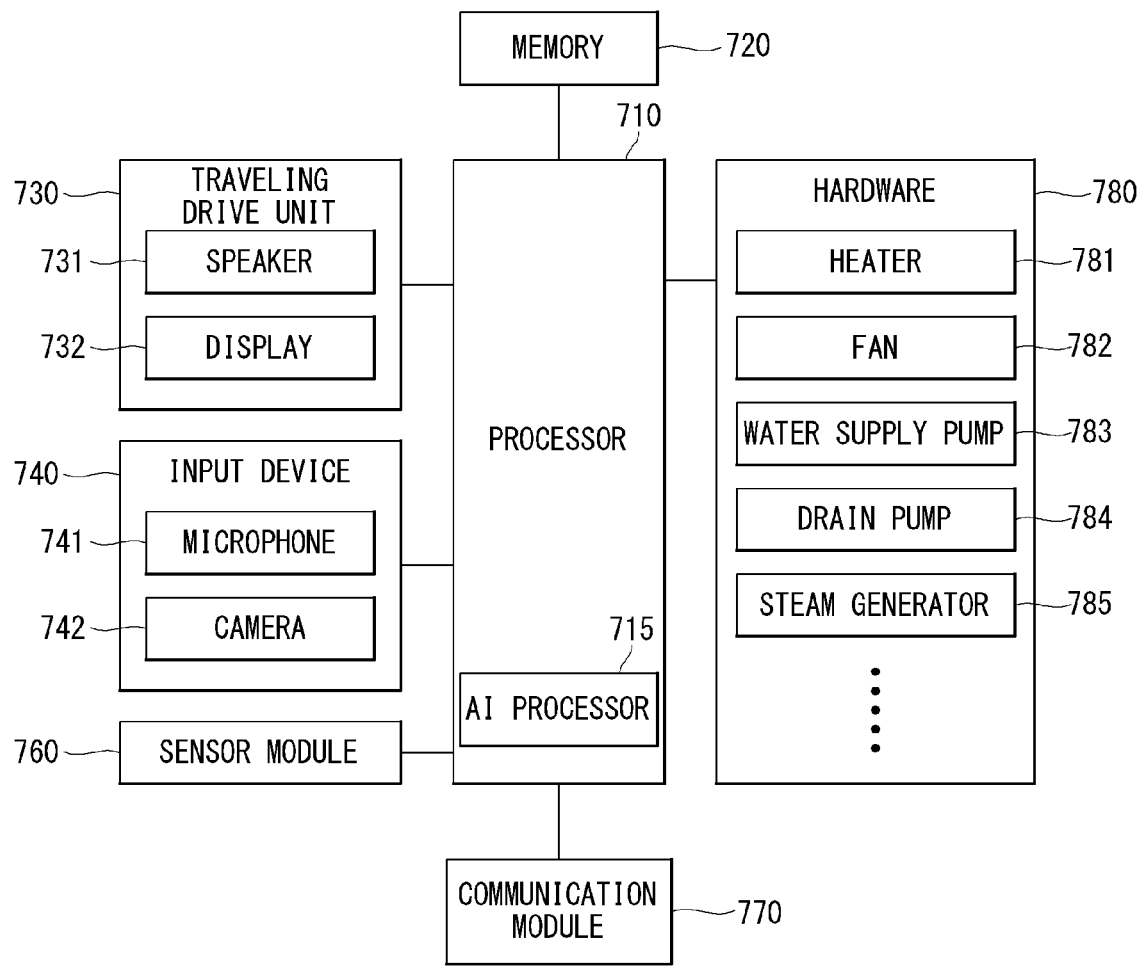

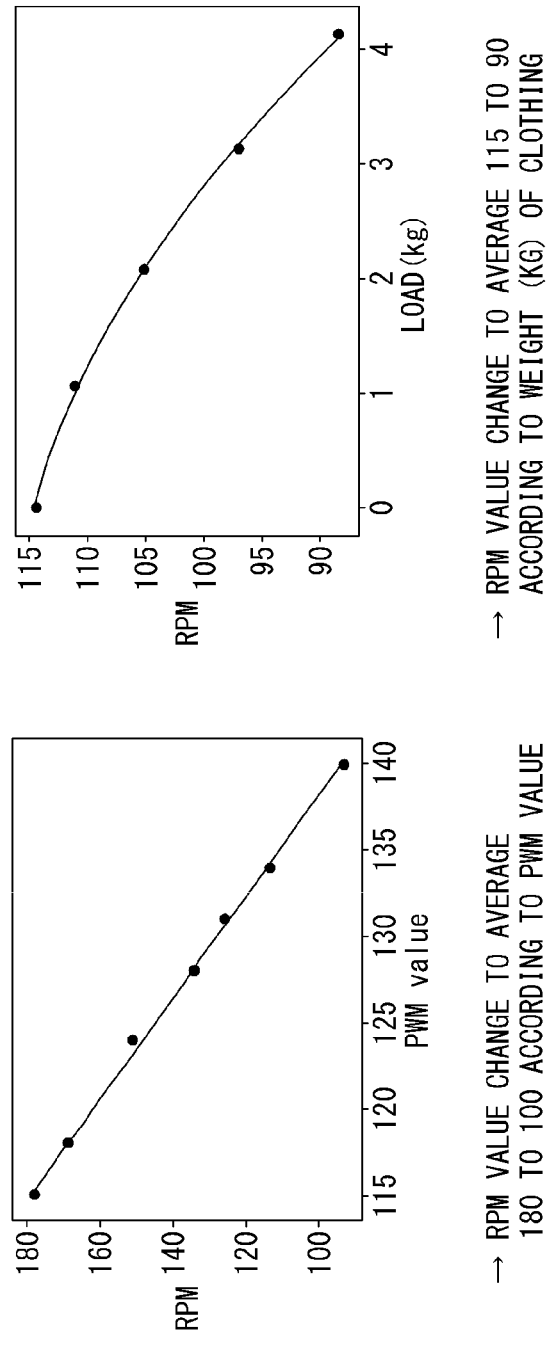

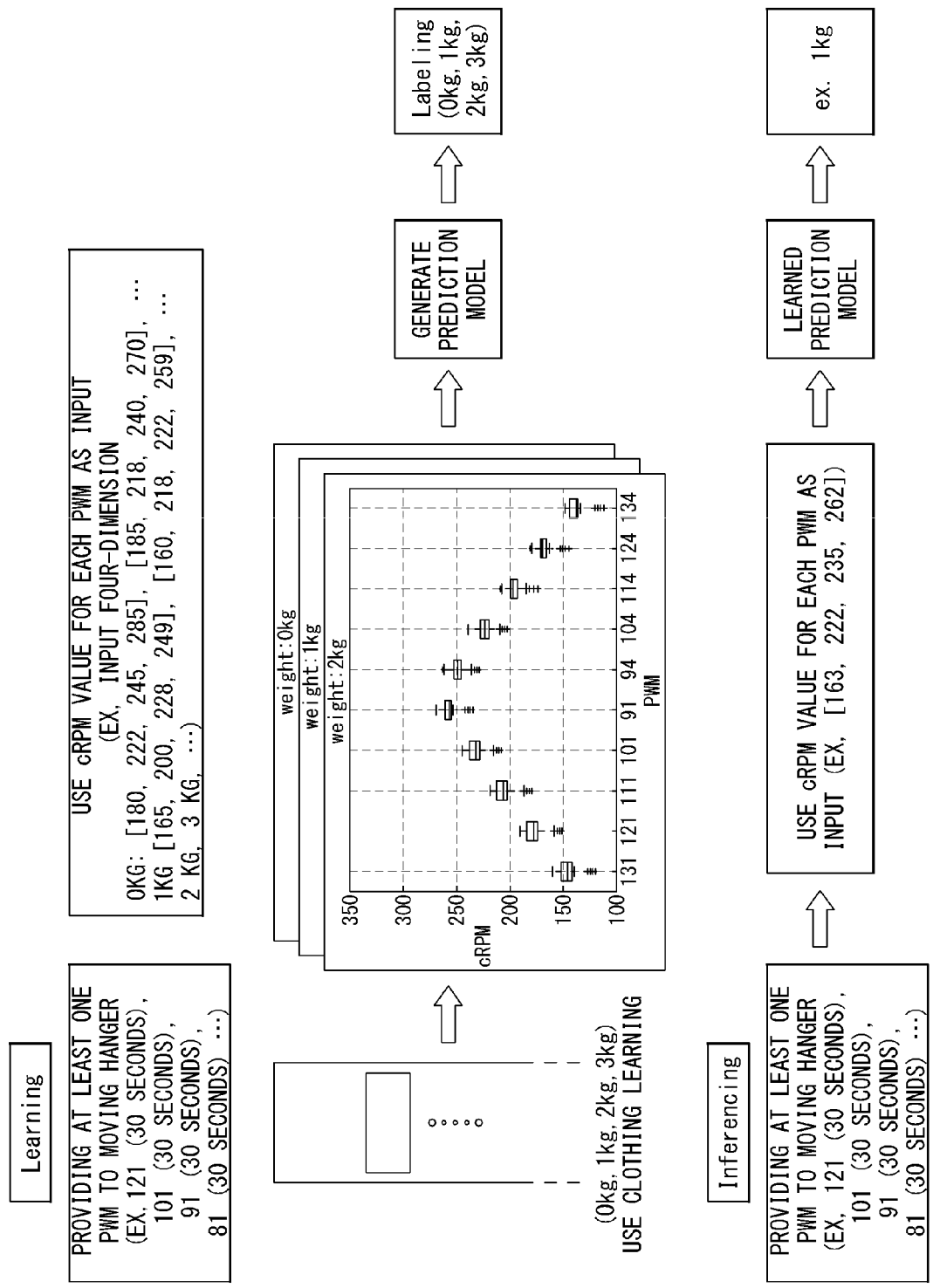
[FIG. 10]

[FIG. 11]
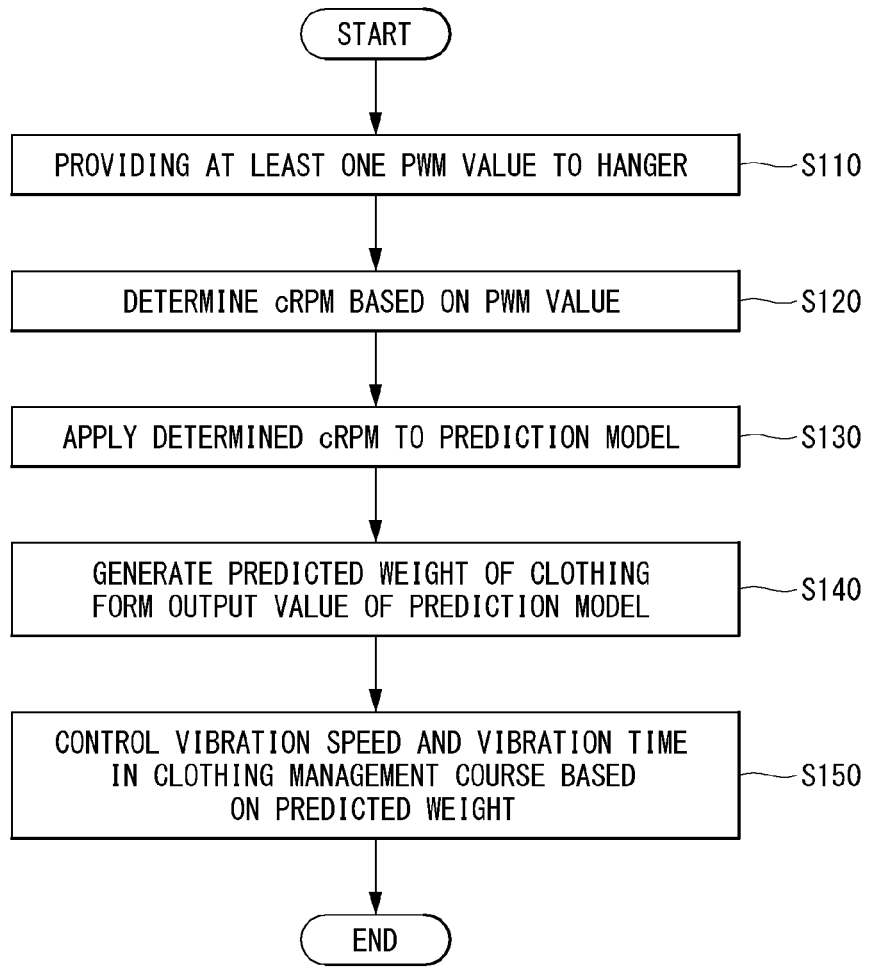

[FIG. 12]
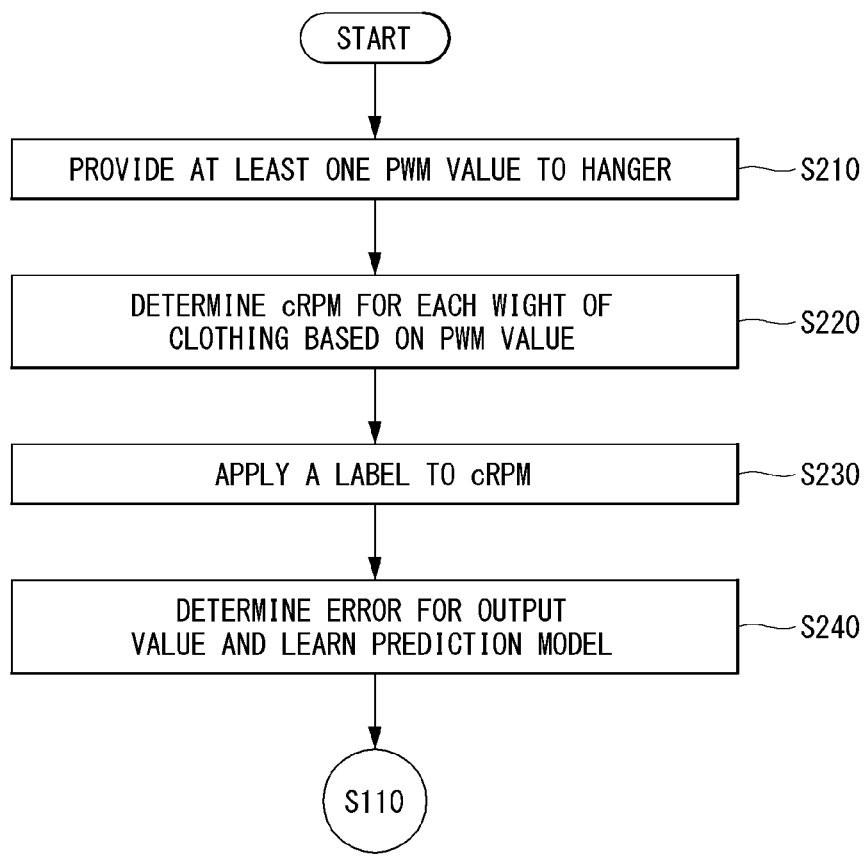

[FIG. 13]
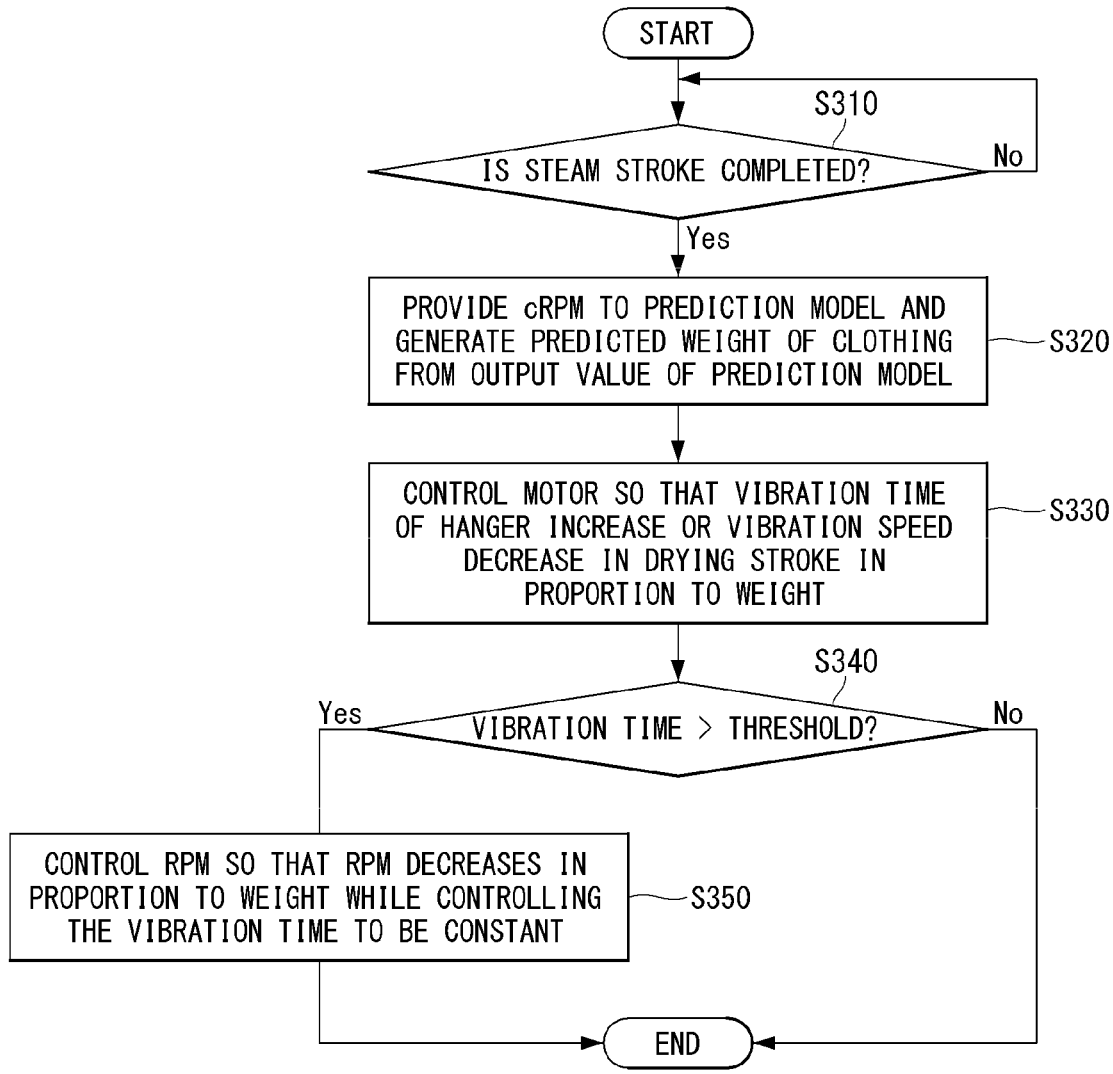

[FIG. 14]
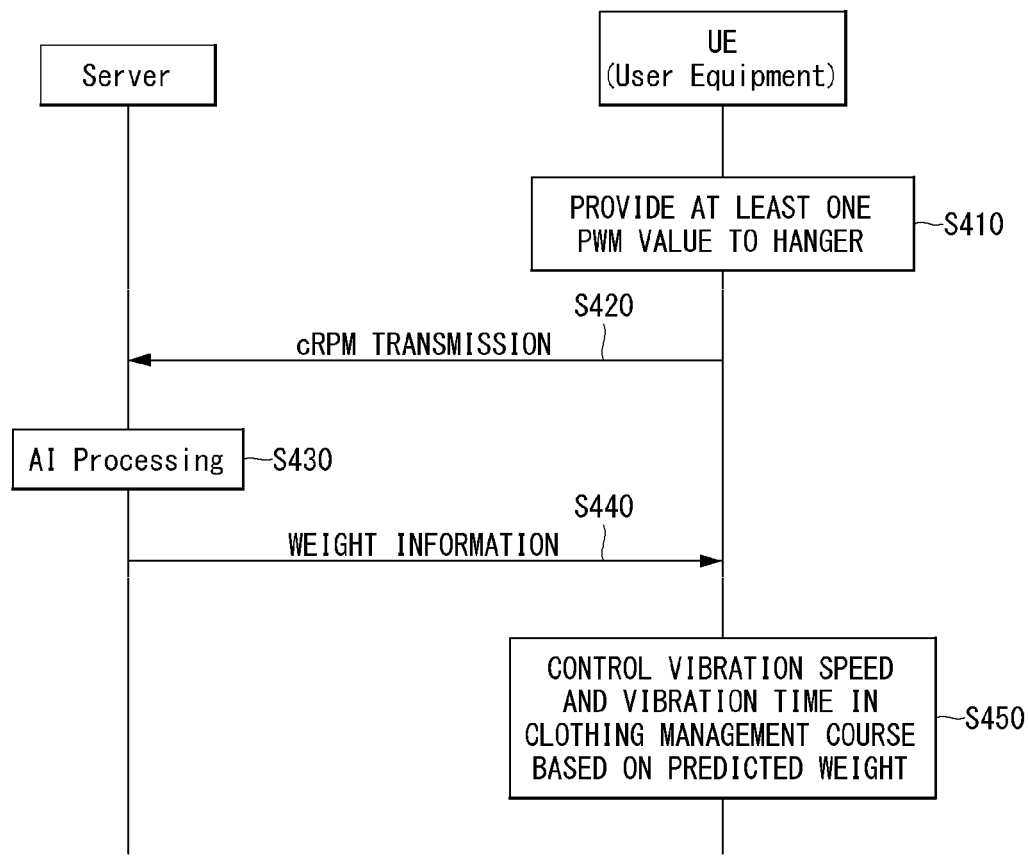
[FIG. 15]
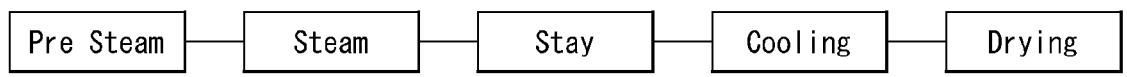

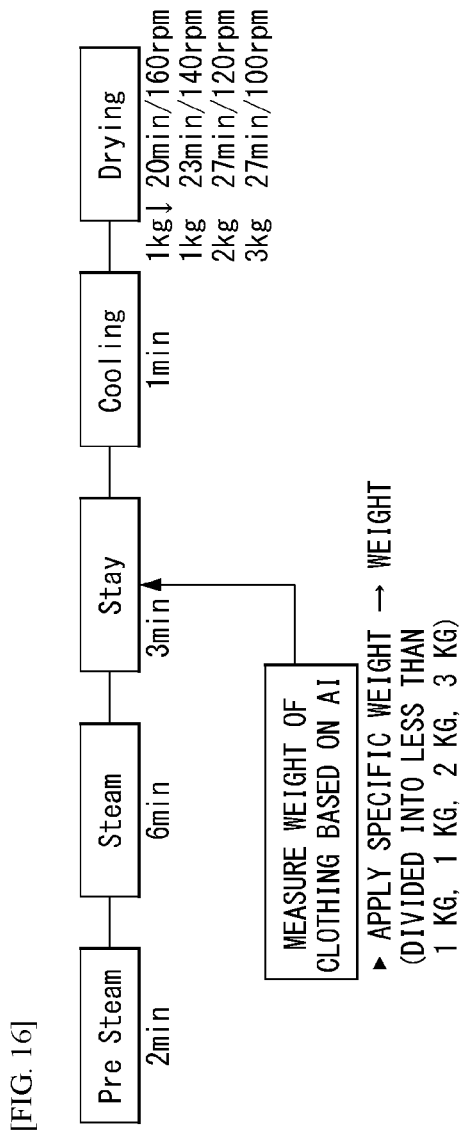
[FIG. 16]

CLOTHING MANAGEMENT USING MOVING HANGER

CROSS REFERENCE TO RELATED APPLICATIONS

This non-provisional application claims the benefit under 35 U.S.C. § 119(a) to Patent Application No. 10-2019-0138529, filed in the Republic of Korea on Nov. 1, 2019, which is hereby expressly incorporated by reference into the present application.

BACKGROUND OF THE DISCLOSURE

Field of the Disclosure

The present disclosure relates to a clothing management using a moving hanger.

Related Art

An Artificial Intelligence (AI) system is a computer system which realizes human-level intelligence, and unlike the existing a Rule-based smart system, is a system in which a machine trains and determines itself and becomes intelligent. As the AI system is used, a recognition rate is improved and a user preference can be understood more accurately, and thus, the existing Rule-based smart system is gradually being replaced by a deep learning-based AI system.

An artificial intelligence technology includes machine learning (deep learning) and element technologies using the machine learning.

The machine learning is an algorithm technology which classifies/trains characteristics of input data by itself, and the element technology is a technology which simulates a function such as cognition and determination of the human brain using the machine learning algorithm such as the deep learning, and includes a technical field such as verbal understanding, visual understanding, reasoning/prediction, a knowledge expression, or a motion control.

The clothing styler can manage clothing based on the weight of the clothing hanging on the hanger. In this case, if a weight sensor is used in a clothing styler, there are additional cost and design problems associated with using the weight sensor.

SUMMARY OF THE DISCLOSURE

The present disclosure aims to address the above-mentioned needs and/or problems.

The present disclosure also provides clothing management method and clothing management apparatus using a moving hanger which performs a clothing management operation according to weight of clothing.

The present disclosure also provides clothing management method and clothing management apparatus using a moving hanger which can predict weight of clothing using a hanger.

In an aspect, there is provided a method of controlling a clothing styler including: providing at least one pulse width modulation (PWM) value to a motor vibrating a moving hanger to determine a current RPM (cRPM) based on the PWM value; generating predicted weight of clothing from an output value of a prediction model based on the determined cRPM applied to the prediction model, wherein the prediction model is a pre-trained artificial neural network; and controlling a vibration speed and a vibration time in a clothing management course based on the predicted weight.

Moreover, the moving hanger may be vibrated in one of a front-rear direction, an up-down direction, and a right-left direction based on driving of the motor.

The least one PWM value may be applied to the moving hanger during a preset time.

The cRPM may be an average RPM value of the cRPMs determined corresponding to the at least one PWM value.

The cRPM may be a feature vector which is generated corresponding to the at least one PWM value.

A dimensional value of the feature vector may be the same as the number of at least one PWM value.

The prediction model may be one of a regression model and a classification model.

The method may further include generating the prediction model using a training dataset labeled with weight information of the clothing related to the cRPM.

The clothing management course may include at least one of a pre-steam stroke, a steam stroke, a stay stroke, a cooling stroke, and a drying stroke.

The predicting of the weight of the clothing may be initiated in response to an end of the steam stroke.

The vibration time may be controlled to be increased in the drying stroke in proportion to the predicted weight.

The vibration speed of the moving hanger in the drying stroke may be controlled to be decreased in inverse proportion to the predicted weight.

When the vibration time reaches a preset specific value, the vibration time may be controlled to be maintained at the specific value.

In another aspect, there is provided a clothing styler including: a communication module; a memory; and a processor which provides at least one pulse width modulation (PWM) value to a motor vibrating a moving hanger to determine a current RPM (cRPM) based on the PWM value, generate predicted weight of clothing from an output value of a prediction model based on the determined cRPM applied to the prediction model, wherein the prediction model is a pre-trained artificial neural network, and controls a vibration speed and a vibration time in a clothing management course based on the predicted weight.

BRIEF DESCRIPTION OF THE DRAWINGS

To aid understanding of the present disclosure, the accompanying drawings, which are included as a portion of the detailed description, provide embodiments of the present disclosure, and describe the technical features of the present disclosure along with the detailed description.

FIG. 1 illustrates a block diagram of a wireless communication system to which methods proposed in the present disclosure can be applied.

FIG. 2 illustrates an example of a signal transmission/reception method in a wireless communication system.

FIG. 3 illustrates an example of a basic operation of a user terminal and a 5G network in a 5G communication system.

FIG. 4 is a block diagram of an AI device applied to various embodiments of present disclosure.

FIG. 5 is a block diagram of an electronic device.

FIGS. 6 and 7 are views illustrating an appearance of a clothing styler applied to various embodiments of present disclosure.

FIG. 8 is a block diagram of the clothing styler applied to various embodiments of present disclosure.

FIG. 9 is a diagram for explaining an RPM change of the clothing styler according to a PWM value applied to a motor.

FIG. 10 is a diagram for explaining a prediction model applied to various embodiments of present disclosure.

FIG. 11 is a flowchart of a clothing management method according to a first embodiment of present disclosure.

FIG. 12 is a flowchart of a learning method of a prediction model according to various embodiments of the present disclosure.

FIG. 13 is a flowchart of a clothing management method according to a second embodiment of present disclosure.

FIG. 14 is a flowchart of a clothing management method according to a third embodiment of present disclosure.

FIG. 15 is a diagram for explaining a general clothing management course.

FIG. 16 is a diagram for explaining a clothing management course according to various embodiments of the present disclosure.

DESCRIPTION OF EXEMPLARY EMBODIMENTS

An AI device 20 may include an electronic device including an AI module capable of performing AI processing or a server including the AI module. The AI apparatus 20 may be included as a configuration of at least a portion of a device 10 illustrated in FIG. 5 and may be provided to perform at least some of AI processing together.

The AI processing may include all operations related to a control of the device 10 illustrated in FIG. 5. For example, an autonomous vehicle may execute AI processing on sensing data or driver data to perform processing/determination and control signal generation. Further, for example, the autonomous vehicle may execute AI processing on data obtained through interaction with other electronic devices provided in the vehicle to perform an autonomous driving control.

FIG. 5 is a block diagram of an electronic device.

Referring to FIG. 5, an electronic device 100 includes at least one processor 110, a memory 120, an output device 130, an input device 140, an input/output interface 150, a sensor module 160, and a communication module 170.

The processor 110 may include one or more application processors (APs), one or more communication processors (CPs), or at least one artificial intelligence processors (AIs). The application processor, communication processor, or AI processor may be included in different integrated circuit (IC) packages or may be included in one IC package.

The application processor may drive an operating system or application program to control a number of hardware or software components connected to the application processor, and perform various data processing/computation including multimedia data. As an example, the application processor may be implemented as a system on chip (SoC). The processor 110 may further include a graphic processing unit (GPU) (not illustrated).

The communication processor may manage a data link and convert a communication protocol in communication between the electronic device 100 and other electronic devices connected through a network. In an example, the communication processor may be implemented as the SoC. The communication processor may perform at least part of a multimedia control function.

Moreover, the communication processor may control data transmission and reception of the communication module 170. The communication processor may be implemented to be included as at least a portion of the application processor.

The application processor or the communication processor may load and process instructions or data received from at least one of a non-volatile memory or other components connected to each of the application processor or the communication processor into a volatile memory. In addition, the application processor or the communication processor may store data received from at least one of the other components or generated by at least one of the other components in a non-volatile memory.

The memory 120 may include an internal memory or external memory. The internal memory may include at least one of a volatile memory (for example, dynamic RAM (DRAM), static RAM (SRAM), synchronous dynamic RAM (SDRAM), or the like) or a non-volatile memory non (for example, one time programmable ROM (OTPROM), a programmable ROM (PROM), erasable and programmable ROM (EPROM), electrically erasable and programmable ROM (EEPROM), mask ROM, flash ROM, NAND flash memory, NOR flash memory, or the like). According to an embodiment, the internal memory may have the form of a solid state drive (SSD). The external memory may further include a flash drive such as compact flash (CF), secure digital (SD), micro secure digital (Micro-SD), mini secure digital (Mini-SD), extreme digital (xD), or a memory stick (memory stick).

The output device 130 may include at least one of a display module or a speaker. The output device 130 may display various data including multimedia data, text data, voice data, or the like to a user or output the sound.

The input device 140 may include a touch panel, a digital pen sensor, a key, or an ultrasonic input device. As an example, the input device 140 may be the input/output interface 150. The touch panel may recognize a touch input using at least one of a capacitive method, a pressure-sensitive method, infrared, or an ultrasonic method. Moreover, the touch panel may further include a controller (not illustrated). In the case of the capacitive method, not only direct touch but also proximity recognition is possible. The touch panel may further include a tactile layer. In this case, the touch panel may provide a tactile reaction to the user.

The digital pen sensor may be implemented by using the same or similar method as receiving a touch input of the user or using a separate recognition layer. The key may be a keypad or a touch key. The ultrasonic input device is a device which can detect data by detecting a micro-sonic wave at a terminal through a pen generating an ultrasonic signal, and can perform wireless recognition. The electronic device 100 may also receive a user input from an external device (for example, a network, computer, or server) connected to the electronic device 100 using the communication module 170.

The input device 140 may further include a camera module and a microphone. The camera module is a device which can capture an image and a video, and may include one or more image sensors, an image signal processor (ISP), or a flash LED. The microphone can receive a voice signal and convert the voice signal into an electrical signal.

The input/output interface 150 may transmit a command or data input from a user through the input device or output device to the processor 110, the memory 120, and the communication module 170 through a bus (not illustrated). As an example, the input/output interface 150 may provide data for the touch input of the user through the touch panel to the processor 110. As an example, the input/output interface 150 may output the commands or data received from the processor 110, the memory 120, and the communication module 170 through the bus through the output device 130. As an example, the input/output interface 150 may output voice data processed through the processor 110 to a user through a speaker.

The sensor module 160 is a gesture sensor, a gyro sensor, a barometric pressure sensor, a magnetic sensor, an acceleration sensor, a grip sensor, a proximity sensor, an RGB (red, green, blue) sensor, a bio sensor, a temperature/humidity sensor, an illuminance sensor, or a UV (ultra violet) sensor. The sensor module 160 may measure a physical quantity or detect an operating state of the electronic device 100 to convert measured or detected information into an electrical signal. Additionally or alternatively, the sensor module 160 may include an E-nose sensor, an EMG sensor (electromyography sensor), an EEG sensor (electroencephalogram sensor, not illustrated), an ECG sensor (electrocardiogram sensor), and a PPG sensor (photoplethysmography sensor), a heart rate monitor sensor (HRM) sensor, a perspiration sensor, a fingerprint sensor, or the like. The sensor module 160 may further include a control circuit for controlling at least one sensor included therein.

The communication module 170 may include a wireless communication module or RF module. For example, the wireless communication module may include Wi-Fi, BT, GPS or NFC. For example, the wireless communication module can provide a wireless communication function using a radio frequency. Additionally or alternatively, the wireless communication module may include a network interface or modem for connecting the electronic device 100 to a network (for example, Internet, LAN, WAN, telecommunication network, cellular network, satellite network, POTS or 5G network, or the like).

For example, the RF module may transmit or receive data, an RF signal or a called electronic signal. As an example, the RF module may include a transceiver, a power amp module (PAM), a frequency filter, or a low noise amplifier (LNA). In addition, the RF module may further include a component for transmitting or receiving an electromagnetic wave in a free space in wireless communication, for example, a conductor or a conductive wire.

The electronic device 100 according to various embodiments of the present disclosure may include at least one of a television, a refrigerator, an oven, a clothing styler, a robot cleaner, a drone, an air conditioner, an air cleaner, a PC, a speaker, a home CCTV, a lighting, a washing machine, and a smart plug. The components of the electronic device 100 described in FIG. 4 exemplify components generally provided in the electronic device, and the electronic device 100 according to the embodiment of the present disclosure is not limited to the above-described components and may be omitted and/or added if necessary. The electronic device 100 may receive the AI processing result from the AI device illustrated in FIG. 4 to perform an artificial intelligence-based control operation, or include an AI module in which components of the AI device are integrated into one module to perform AI processing an on-device method.

The electronic device 100 applied to various embodiments of the present disclosure may be a clothing styler. In the present disclosure, the "clothing styler" and a "clothing management device" can be used interchangeably with each other. Hereinafter, a clothing management method using an artificial intelligence-based clothing styler will be described in detail below.

FIGS. 6 and 7 are views illustrating an appearance of a clothing styler applied to various embodiments of present disclosure.

Referring to 6 and 7, a clothing styler 10 according to an embodiment of the present disclosure includes a cabinet 220.

The cabinet 220 include a processing chamber which accommodates clothing and can perform an operation of removing wrinkles of the clothing or deodorizing the clothing through steam or air circulation, and a machine room 240 which is disposed below the processing chamber 225 and in which a number of parts for processing the clothing are installed.

The cabinet 220 includes a partition plate 222 which partitions the processing chamber 225 and the machine room 240. The processing chamber 225 may be formed above the partition plate 222, and the machine room 240 may be formed below the partition plate 222.

The processing chamber 225 may be defined as a space formed by an inner wall of the cabinet 220. As an example, the processing chamber 225 may be defined as a space formed by an upper wall, upper portions of right and left walls, and an upper portion of a rear wall of the cabinet 220. In addition, the machine room 240 may be defined as a space formed by a lower wall, lower portions of the right and left walls, and a lower portion of the rear wall of the cabinet 220.

A moving hanger 260 on which a hanger for mounting the clothing can be hung is provided inside the cabinet. The moving hanger 260 may be disposed in the upper portion of the processing chamber 225. The hanger 260 may be configured to move in a plurality of directions by a driving device such as a motor. For example, the plurality of directions may include a front-rear direction, an up-down direction, and a right-left direction. Moreover, the "hanger" and the "moving hanger" can be used interchangeably with each other.

The clothing styler 10 further includes a discharge unit 250 which can discharge steam or heated air (warm air) into the processing chamber 225. As an example, the discharge unit 250 may be formed in a portion where the rear wall of the cabinet 220 meets the rear portion of the partition plate 222.

The clothing styler 10 further includes an inlet 255 for discharging air in the processing chamber 225, particularly, humidifying the clothing after treating the clothing in the processing chamber 225 or discharging air containing contaminant particles and odor particles to the machine room 240 side. The inlet 255 may be formed in a front portion of the partition plate 222.

The clothing styler 10 may include a plurality of tanks 280 and 290 disposed in a front portion of the machine room 240. The plurality of tanks 280 and 290 may include a water supply tank 280 which supplies water to a steam generator (not illustrated). The water in the water supply tank 280 may be supplied to the steam generator through a water supply pump (not illustrated). The steam generator may be provided in the machine room.

The plurality of tanks 280 and 290 may further include a drain tank 290 which collects and stores a condensate generated in the processing chamber 225 or a condensate generated in a heat pump (not illustrated). The condensate generated in the heat pump may flow to the drain tank 290 through a drain pump (not illustrated). The heat pump may be provided in the machine room 240.

The water supply tank 280 and the drain tank 290 are exposed to the lower portion of the clothing styler 10 when a door 230 is opened, and may be provided to be detachable by a user. The user can separate the water supply tank 280 to replenish water, and separate the drain tank 290 to discard the water stored in the drain tank 290.

The clothing styler 10 further includes the door 230 which can open or close the processing chamber 225. As an example, the door 230 is disposed in front of the cabinet 220 and may be rotatably coupled to the cabinet 220.

A pants wrinkle management device 300 for removing wrinkles of pants may be provided on the rear surface of the door 230, that is, an inner surface of the door 230. A pants hanger 232 on which a hanger 233 for mounting the pants can be hung is provided on the upper side of the pants wrinkle management device 300. After the user mounts the pants on the hanger, the user can hang the hanger on the pants hanger 232.

In addition, the pants may be mounted on the pants wrinkle management device 300 and fixed flatly. In a course of the operation of the clothing styler 10, steam or warm air is supplied to the pants wrinkle management device 300, and thus, the wrinkles of the pants are removed and a pleat can be formed in a desired direction.

The pants wrinkle management apparatus 300 includes a press plate 310 coupled to the rear surface of the door 230 and a press door 350 coupled to a front side of the press plate 310. The press plate 310 or the press door 350 may be made of a metal or plastic material.

Referring to FIG. 7, the pants PAN hung by the pants hanger 232 may be placed in front of the press plate 310, and the press door 350 may be closed in front of the pants PAN. The pants PAN are pressed between the press plate 310 and the press door 350, and in this process, the pleat (knife pleat) may be formed in the pants (PAN). That is, the pants PAN are mounted on the pants wrinkle management device 300, and thus, it is possible to obtain the effect of ironing.

The press door 350 includes a door body 351 in which a through portion 353 is formed. The through portion 353 is formed at a substantially central portion of the door body 351, and steam or warm air present in the processing chamber 25 may be applied to the pants PAN mounted behind the press door 350 through the through portion 353.

The press door 350 may be rotatably coupled to the door 230. Specifically, the press door 350 includes a hinge portion 352 coupled to the door 230. The hinge portion 352 may be provided on one side of the door body 351, for example, on a left side of the door body 351. In addition, a plurality of hinge portions 352 may be provided, and the plurality of hinge portions 352 may be arranged to be spaced apart in the up-down direction on the left side of the door body 351.

The door body 351 includes latches 355 and 356 coupled to the door 230. The latches 355 and 356 include the first latch 355 provided on one side of the door body 351 and the second latch 356 provided on the other side of the door body 351. As an example, the first latch 355 may be provided on the left side of the door body 351, and the second latch 356 may be provided on the right side of the door body 351.

The first latch 355 may be disposed between the plurality of hinge portions 352 based on the up-down direction. In addition, a height of the first latch 355 may be the same as a height of the second latch 356.

The door 230 includes a first latch coupler 235 coupled to the first latch 355 and a second latch coupler 236 coupled to the second latch 356. The latches 355 and 356 are coupled to the latch couplers 235 and 236. Accordingly, the press door 350 may not move in the course of the operation of the clothing styler 10, and can easily press the pants PAN in a closed state of the press door 350.

The pants wrinkle management apparatus 300 further includes a film 330 which is disposed between the press plate 310 and the press door 350 and presses the pants PAN. The film 330 may be made of a flexible material.

However, the film 330 has a relatively thin thickness and is configured to have a bending stiffness such that the film 330 is not easily bent by a pressure, and thus, may provide a compressive force to the pants PAN.

Specifically, the film 330 may be made of a plastic material. As an example, the film 330 may be made of polycarbonates, polypropylene, or polyethylene terephthalate (PET).

A thickness of the film 330 may be 0.5 to 1.0 mm so as to be formed relatively thin. Since the film 330 is relatively thin, the user can easily operate the film 330. Moreover, it is possible to reduce an occurrence of a movement in a direction of generating wrinkles on the pants PAN on which the film 330 is mounted by a pressing force transmitted from the press plate 310 and the press door 350.

The door 230 includes a clip 234 supporting lower portions of the pants PAN. The clip 234 is configured to press front portions of the pants PAN in a state where the pants PAN are mounted, and thus, can prevent the pants PAN from being shaken.

The film 330 may be located on both sides of the pants PAN, that is, between the right portion and the left portion where legs are inserted. As an example, based on FIG. 7, the left portion of the pants PAN may be placed on a front surface of the press plate 310 and the film 330 can be in close contact with the front portion on the left side of the pants PAN.

In addition, the right portion of the pants PAN is located in front of the film 330, and the clip 234 can be fitted in a front lower portion of the right portion of the pants PAN. That is, the right portion of the pants PAN may be moved to a rear side of the clip 234 and supported by the clip 234. Moreover, the press door 350 is located in front of the clip 234 to press the pants PAN.

According to this arrangement, the knife pleat of the pants PAN can be formed and the wrinkles can be removed by the pants wrinkle management device 300.

FIG. 8 is a block diagram of the clothing styler applied to an embodiment of present disclosure.

Referring to FIG. 8, the clothing styler 10 may include a processor 710, a memory 720, an output device 730, an input device 740, a sensor module 760, a communication module 770, and hardware 780.

The processor 710 may store information supporting various functions of the clothing styler 10 in the memory 720. The memory 720 may store a plurality of application programs or applications driven by the clothing styler 10 and information and instructions for the operation of the clothing styler 10. Some of these applications can be downloaded from external servers via wireless communication. In addition, the memory 720 may store user information about one or more users who wish to interact with the clothing processing device. The user information may include user identification information through voice recognition, user identification information through vision recognition, user identification information through biometric sensing, user identification information through menu input, or the like, but is not limited thereto.

The processor 710 is a central processing unit and may control the overall operation of the clothing styler 10 by driving control software mounted in the memory 720. The processor 710 provides at least one pulse width modulation (PWM) value to a motor which vibrates the moving hanger 260, determines a current RPM (cRPM) based on the PWM value, and generates the predicted weight of the clothing based on the determined cPRM applied to the prediction model, in which the prediction model is a pre-trained artificial neural network.

In this case, the processor 710 may control a vibration speed and a vibration time in a clothing management course based on the predicted weight.

The processor 710 may be communicatively connected to the AI device for performing machine learning to receive a response including an AI processing result as illustrated in FIG. 3, and may control the clothing styler 10 based on the received response. The AI device may be provided as a part (for example, the AI processor 715) of the processor 710 to perform some of the AI processing together. The AI processor 715 may control all operations related to the AI device.

The memory 720 may include at least one storage medium of a flash memory type storage medium, a hard disk type storage medium, a multimedia card micro type storage medium, a card type memory (for example, SD or XD memory, or the like), a random access memory(RAM), a static random access memory (SRAM), a read-only memory (ROM), an electrically erasable programmable read-only memory (EEPROM), a programmable read-only memory (PROM), a magnetic memory, a magnetic disk, and an optical disc. The clothing styler 10 may be operated in connection with a web storage which performs a storage function of the memory 720 on the Internet.

The output device 730 may include a speaker 731, a display 732, or the like, but is not limited thereto.

The speaker 731 may output an alert message such as a warning sound, an operation mode, an operation state, and an error state under a control of the processor 710, information corresponding to a voice command of the user, and a processing result corresponding to the voice command of the user, as an audio. The speaker 731 may convert an electrical signal from the processor 710 to the audio signal and output the converted electrical signal.

The display 732 may display an operating state of the clothing styler 10 under the control of the processor 710. The display 732 can include a control panel. The control panel may include at least one of a power setter which sets on/off of power, a course setter which selects various preset clothing management courses, and an operation/stop selector which selects an operation and stop of an operation according to the selected clothing management course, or a state displayer which displays an operating state of the clothing styler 10.

In addition to a function of displaying various information, the display 732 may also perform a function of the input device 740 which receives a predetermined control command so that the user can control the overall operation of the clothing styler 10. To this end, the display 732 may include a touch screen. As an example, the display 732 may provide an output interface and an input interface between the clothing styler 10 and the user through a touch screen.

The input device 740 may include a microphone 741, a camera 742, or the like.

The microphone 741 may receive a user voice spoken toward the clothing styler 10 under the control of the processor 710. In addition, the clothing styler 10 may include a plurality of microphones in order to more accurately receive the user voice. Here, each of the plurality of microphones may be arranged spaced apart from each other, and may process the user voice as an electrical signal.

The camera 742 processes an image frame such as a still image or a video image acquired by the image sensor. The image frame processed by the camera 742 may be stored in the memory 720 or transmitted to an external device through the communication module 770. At least one camera 742 may be disposed in the clothing styler 10. As an example, an external camera of at least one camera may capture an image outside the clothing styler. As an example, an internal camera of at least one camera may be disposed to capture at least one of hardware components such as the processing chamber 225, the moving hanger 260, and the inlet 255. The image acquired through the camera 742 may be used for AI processing including vision recognition.

The sensor module 760 is a gesture sensor, a gyro sensor, a barometric pressure sensor, a magnetic sensor, an acceleration sensor, a grip sensor, a proximity sensor, an RGB (red, green, blue) sensor, a bio sensor, a temperature/humidity sensor, an illuminance sensor, or a UV (ultra violet) sensor. The sensor module 760 may measure a physical quantity or detect an operating state of the electronic device 100 to convert measured or detected information into an electrical signal. Additionally or alternatively, the sensor module 760 may include an E-nose sensor, an EMG sensor (electromyography sensor), an EEG sensor (electroencephalogram sensor, not illustrated), an ECG sensor (electrocardiogram sensor), and a PPG sensor (photoplethysmography sensor), a heart rate monitor sensor (HRM) sensor, a perspiration sensor, a fingerprint sensor, or the like. The sensor module 760 may further include a control circuit for controlling at least one sensor included therein. Meanwhile, the clothing styler may combine data sensed by at least two of these sensors to variously use the data.

The communication module 770 may provide a communication interface necessary to provide transmission/reception signals between the clothing styler 10, a user terminal, and/or a server in a packet data form in conjunction with a network (for example, 3G, 4G, LTE, or 5G network). In addition, the communication module 770 can support various Internet of Things (IoT), Internet of Everything (IoE), Internet of Small Things (IoST), and can support machine to machine (M2M) communication, vehicle to everything communication (V2X), device-to-device (D2D) communication, or the like.

The hardware 780 may include a heater 781, a fan 782, a water supply pump 783, a drain pump 784, a steam generator 785, or the like, and according to a function and use of the clothing styler 10, various aforementioned components may be omitted, or other components may be further included.

As an example, the heater 781 may be used to dry clothing along with the fan 782. As an example, when the water in the water supply tank 280 is supplied to the steam generator 785, the steam generator 785 may heat the water through the heater 781 to generate steam. To facilitate water replenishment, the water supply tank 280 may be detachably installed in the cabinet 220. The user can separate the water supply tank 280 and replenish water therein. The drain tank 290 may store a condensate generated in the processing chamber 225 or a condensate generated in a heat pump (not illustrated). The condensate generated by the heat pump may flow to the drain tank 290 through the drain pump 784. If there is no drain tank 290, a separate drain pump 784 may be included.

FIG. 9 is a diagram for explaining an RPM change of the clothing styler according to the PWM value applied to a motor.

The processor 710 can control a rotation speed of the motor by controlling a duty ratio of the motor which vibrates the moving hanger 260 provided in the clothing styler 10 and the pulse width modulation (PWM) signal. The "PWM value" and the "PWM duty ratio" can be used interchangeably with each other.

The PWM duty ratio of the pulse width control may have a value of 0 to 255. The processor 710 may set the PWM value between 0 and 255, and supply a driving current based on the set PWM value to the motor. That is, the rotation speed of the motor may be determined based on the PWM value.

RPM of the moving hanger 260 of the clothing styler 10 may be determined according to RPM of the motor which controls the movement of the moving hanger 260. Referring to FIG. 9, the RPM may change linearly according to a change in the PWM value. As an example, when there is no clothing in the moving hanger 260, the RPM may be changed from 180 rpm to 100 rpm as the PWM value is changed from 115 to 140. That is, as the PWM value increases, the RPM of the moving hanger 260 may gradually decrease.

In addition, the RPM of the moving hanger 260 may decrease linearly as the weight of the clothing hanging on the moving hanger 260 increases. As an example, assuming that the PWM value is fixed to 143, the RPM of the moving hanger 260 may be gradually changed from 115 rpm to 90 rpm as the weight of the clothing increases from 0 kg to 4 kg. That is, as the weight of the clothing hanging on the moving hanger 260 increases, the RPM of the moving hanger 260 may gradually decrease.

In the following specification, a method will be described in detail, in which the weight of the clothing is inferred without using a weight sensor, based on a relationship between the RPM of the moving hanger 260 and the PWM value of the clothing and a relationship between the RPM of the moving hanger 260 and the weight of the clothing, and the clothing styler 10 is controlled based on the inferred weight.

FIG. 10 is a diagram for explaining the prediction model applied to various embodiments of present disclosure.

Referring to FIG. 10, the prediction model applied to various embodiments of present disclosure may be generated through a learning step.

The AI device may generate a learning model which predicts the weight of the clothing supplied to the clothing styler 10 using a plurality of learning data. In a method of generating the prediction model according to various embodiments of present disclosure, the AI processor 715 provides at least one PWM value to the moving hanger 260 and can determine cRPM (current RPM) for each weight of the clothing based on the PWM value. The "cRPM" and the "drive RPM" can be used interchangeably with each other and the cRPM indicates an RPM which is measured when a motor is actually driven according to a request RPM (rRPM) by the processor 710.

As such, the AI device may acquire a plurality of cRPMs by providing at least one PWM value to the moving hanger 260. The AI device can train an artificial neural based learning model using the plurality of collected cRPMs as the learning data. A learning method of the artificial neural based learning model may be divided into supervised learning, unsupervised learning, semi-supervised learning, and reinforcement learning. Of these, the supervised learning refers to a process of determining at least one weight applied to artificial neural using an output label which is an explicit correct answer to data input to an input layer.

The artificial neural based learning model according to an embodiment of the present disclosure may be trained by a supervised learning method, but is not limited thereto. The learning model can be learned through repeated supervised learning using an error backpropagation method for input data. Specifically, according to the error backpropagation method, an error between an output value of the learning model and an output label is propagated in a reverse direction from the output layer to the input layer through the hidden layer. In the process of propagating the error, the weights between nodes are updated in the direction of reducing the error. In this case, the AI device repeats a learning process of the learning model until the error decreases below a preset threshold, and as a result, can calculate an optimal weight.

Now, an inference process using the trained artificial neural based learning model will be described. The "learned artificial neural based on learning model" may be referred to as a "weight prediction model" or a "prediction model".

In the inference process, the processor 710 may provide at least one PWM value to the moving hanger 260 and obtain at least one cRPM as a result of the provision. The processor 710 may provide cRPM as input data to the prediction model. The processor 710 may predict the weight of the clothing from the output value of the prediction model.

In an embodiment of the present disclosure, the input data may be a vector formed by a dimension corresponding to at least one PWM value applied to the moving hanger 260. For example, when 121, 101, 91, and 81 are provided as PWM values, cRPM corresponding to each PWM value may be represented by a vector such as [163, 222, 235, 262].

In an embodiment of the present disclosure, the input data may be an average value of the cRPMs corresponding to at least one PWM value. As an example, when the PWM values 121, 101, 91, and 81 are provided as described above, the cRPMs corresponding to each PWM value may be obtained as 163, 222, 235, and 262. In this case, the input data may be 220.5, which is an average value of 163, 222, 235, and 262.

In an embodiment, the prediction model may be a classification model. In this case, the output value of the prediction model may be output as a probability distribution of at least one class. The processor 710 may infer input data into a class having the highest probability from at least one probability distribution. As an example, a class of the classification model may include at least one of 0 kg, 1 kg, 2 kg, or 3 kg. In this case, the processor 710 may provide the cRPM based on the PWM value applied to the moving hanger 260 to the prediction model, and the weight of the clothing related the provided cRPM, which is one of the at least one class, may be inferred from the output value.

In an embodiment, the prediction model may be a regression model. In this case, the processor 710 may calculate a score for the input data using the prediction model, and the calculated score may be the weight of clothing corresponding to the input cRPM. As an example, the processor 710 may provide cRPM based on the PWM value applied to the moving hanger 260 to the prediction model, and infer the weight of the clothing related to the provided cRPM from the output value. In this case, unlike the classification model, the weight of the clothing is not classified into a preset class, and may be determined as a specific weight value such as 1.4 kg.

Hereinafter, a flowchart of a clothing management method using the above-described prediction model and a learning method of the prediction model will be described.

FIG. 11 is a flowchart of a clothing management method according to a first embodiment of present disclosure.

Referring to FIG. 11, the processor 710 may provide at least one PWM value to the moving hanger 260 (S110).

Specifically, the processor 710 may provide the PWM value to the motor which controls the movement of the moving hanger 260. As described above, when the PWM value is provided to the motor, the motor may rotate at the RPM based on the PWM value. The moving hanger 260 may vibrate in at least one of the front-rear direction, the up-down direction, and the right-left direction based on a rotational movement of the motor.

In an embodiment of the present disclosure, at least one PWM value provided to the moving hanger 260 may be provided to the moving hanger 260 for a preset time. As an example, at least one PWM value may be provided to the moving hanger 260 for 30 seconds.

The processor 710 may obtain a reliable learning sample or input data by applying the PWM value for a predetermined time.

The processor 710 may determine and/or obtain the cRPM based on the PWM value provided to the moving hanger 260 (S120).

When the PWM value is provided to the moving hanger 260 or the motor which vibrates the moving hanger 260, different cRPMs may be measured based on the weight of the clothing.

The processor 710 may preprocess the measured cRPM in order to generate the input data of a prediction model according to an embodiment of the present disclosure. As an example, as described above, the processor 710 may generate one vector including the cRPM based on at least one PWM value. As an example, as described above, the processor 710 may calculate the average value of the cRPMs based on at least one PWM value, and use the calculated average value as input data. As such, the processor 710 processes the measured cRPM as the vector or the average value, and can use the vector or the average value to predict the weight of the clothing using the prediction model.

The processor 710 may provide the determined cRPM to the prediction model (S130).

In the deep learning model, unlike the machine learning model of the related art, a feature extraction process for input data and a regression and/or classification process according to the extracted features can be simultaneously trained as a model. That is, when using one deep learning model, at least one feature extraction process for input data may not be performed. When the cRPM determined by the processor 710 is provided to the prediction model, the prediction model can extract a feature value or a feature vector corresponding to the cRPM.

In this case, the processor 710 may calculate the output value of the prediction model as a result of calculation using artificial neural having at least one hidden layer.

The processor 710 may predict the weight of the clothing from the output value of the prediction model (S140).

The processor 710 may predict the weight of the clothing from the output value calculated in S130 described above. As described above in FIG. 10, the prediction model may be one of the classification model and the regression model.

In an embodiment, the prediction model may be the classification model. In this case, the output value of the prediction model may be output as a probability distribution of at least one class. The processor 710 may infer input data into a class having the highest probability from at least one probability distribution. As an example, the class of the classification model may include at least one of 0 kg, 1 kg, 2 kg, or 3 kg. In this case, the processor 710 may apply the cRPM based on the PWM value provided to the moving hanger 260 to the prediction model, and infer the weight of the clothing related to the provided cRPM which is one of the at least one class, from the output value.

In an embodiment, the prediction model may be the regression model. In this case, the processor 710 may calculate a score for the input data using the prediction model, and the calculated score may be the weight of the clothing corresponding to the input cRPM. As an example, the processor 710 may provide the cRPM based on the PWM value applied to the moving hanger 260 to the prediction model, and infer the weight of the clothing related to the provided cRPM from the output value. In this case, unlike the classification model, the weight of the clothing is not classified into preset classes, and may be determined to a specific weight value such as 4 kg.

The processor 710 may control the vibration speed and the vibration time of the moving hanger 260 based on the predicted weight (S150).

The control operation of the styler may include at least one of a pre-steam stroke, a steam stroke, a stay stroke, a cooling stroke, an a drying stroke. The processor 710 may control the vibration speed and vibration time of the moving hanger 260 by controlling the RPM of the motor which vibrates the moving hanger 260 in one of the at least one control operation. Examples of each control operation of the styler and implementation of the vibration speed and vibration time of the moving hanger 260 will be described later in FIGS. 15 and 16.

FIG. 12 is a flowchart of a learning method of a prediction model according to various embodiments of the present disclosure.

Referring to FIG. 12, the processor 710 may apply at least one test PWM value to the motor which vibrates the moving hanger 260 (S210).

The processor 710 may determine the cRPM for each clothing weight based on the test PWM value (S220).

The processor 710 may apply a label to the cRPM so as to generate the training dataset and apply the generated training dataset to a prediction model which is a learning target (S230). In this case, the label may be weight information corresponding to cRPM.

The processor 710 may determine an error by applying a loss function to the output value of the prediction model, and train the prediction model using the determined error (S240).

As described above, the prediction model applied to one embodiment of the present disclosure can be trained using the supervised learning method, and the weight of the prediction model can be updated in an error back propagation method, but is not limited thereto.

FIG. 13 is a flowchart of a clothing management method according to a second embodiment of present disclosure.

Referring to FIG. 13, the processor 710 monitors a change in the control operation of the clothing styler 10, and when the steam stroke which is one of the control operations ends (S310:YES), it is possible to predict the weight of the clothing using the cRPM and the pre-trained prediction model (S320).

As such, in an embodiment of the present disclosure, the processes for predicting the weight of the clothing described above may be initiated in response to the end of the steam stroke.

The processor 710 may control the motor to increase the vibration time of the moving hanger 260 or reduce the vibration speed in the drying stroke in proportion to the weight of the clothing(S330).

As an example, the processor 710 may control the vibration time of the moving hanger 260 so that the vibration time increases in the drying stroke in proportion to the weight of the clothing. As an example, the processor 710 may control the vibration speed of the moving hanger 260 so that the vibration speed decreases in the drying stroke inversely proportional to the weight of the clothing. As an example, the processor 710 may control the motor such that the vibration time of the moving hanger 260 increases but the vibration speed of the moving hanger 260 decreases in the drying stroke in proportion to the weight of the clothing.

The processor 710 may control the vibration time to be maintained at the specific value when the vibration time reaches a predetermined specific value. As an example, as described above, the drying time may be gradually increased in proportion to the weight of the clothing, but may be maintained at a predetermined specific value when the drying time reaches the predetermined specific value.

FIG. 14 is a flowchart of a clothing management method according to a third embodiment of present disclosure.

The above-described FIGS. 11 to 13 describe the AI processing using the AI module provided in the clothing styler 10 and the control method using the AI processing result, and hereinafter, FIG. 14 describes an AI operation based on signal transmission and reception with a 5G network including a communication-connected server or at least one server. Contents overlapping with those described above in FIGS. 11 to 13 will be omitted.

Referring to FIG. 14, a user equipment (UE) and a server may be connected to each other through communication. In this case, the UE and the clothing styler 10 can be used interchangeably with each other. In addition, in FIG. 14, the processor refers to a processor of the clothing styler 10, and the AI processor refers to an AI processor included in the server or the 5G network.

The processor 710 may provide at least one PWM value to the moving hanger 260 or the motor connected to the moving hanger 260 (S410).

The processor 710 may control the communication module to transmit the cRPM to the AI processor included in the 5G network. Further, the processor 710 may control the communication module to receive AI processed information from the AI processor.

Meanwhile, the processor 710 may perform an initial access procedure with the 5G network in order to transmit the cRPM to the 5G network. The processor 710 may perform the initial access procedure with the 5G network based on a synchronization signal block (SSB).

In addition, the processor 710 may receive downlink control information (DCI) used for scheduling transmission of the cRPM through the communication module from the 5G network.

The processor 710 may transmit the cRPM to the 5G network based on the DCI.

The cRPM is transmitted to the 5G network through PUSCH, and the DM-RS of the SSB and the PUSCH may be QCL for QCL type D.

Referring to FIG. 14, the processor 710 may transmit the cRPM to the 5G network through the communication module (S420).

Here, the 5G network may include the AI processor or the AI system, and the AI system of the 5G network may perform the AI processing based on the received cRPM (S430).

Specifically, the AI system can provide the cRPM received from the clothing styler 10 to the pre-trained artificial neural based prediction model, and calculate the weight of the artificial neural from the output value of the prediction model.

The 5G network may generate weight information of clothing related to the cRPM based on the weight calculated by the AI system, and transmit the generated weight information to the clothing styler 10 (S440).

The clothing styler 10 may control the vibration speed and the vibration time of the moving hanger 260 based on the received weight information (S450).

FIG. 15 is a diagram for explaining a general clothing management course.

FIG. 15 illustrates at least one stroke in a general clothing management course, and some of the at least one stroke may be omitted or the order thereof may be changed. When the user starts the operation of the clothing styler 10, the processor 710 performs the pre-steam stroke to preheat the heater 781 by supplying power to the heater 781 of the steam generator 785.

The processor 710 may operate the fan 782 during the pre-steam stroke. While the fan 782 is operated, it is possible to measure the temperature of the air supplied into the processing chamber.

When the preheating of the heater 781 at the pre-steam stroke is completed, the processor 710 may perform the steam stroke. The processor 710 may generate steam by supplying water stored in the water supply tank to the steam generator 785 and supply the steam into the processing chamber. The processor 710 may control the fan 782 to circulate air inside the processing chamber.

When the preset time elapses, the processor 710 may end the steam stroke and perform a stay stroke. The stay stroke is a stroke which controls the steam to be sufficiently supplied to the clothing by rotating the fan 782 at a relatively low RPM after the operation of the steam generator 785 stops.

The processor 710 may perform a cooling stroke which rotates the fan 782 at a relatively high RPM to decrease the temperature inside the processing chamber when the preset time elapses.

The processor 710 may terminate the cooling stroke when a preset time elapses, drive the fan 782, and drive a compressor of the heat pump to perform the drying stroke which supplies heated air into the processing chamber.

Hereinafter, FIG. 16 describes the clothing management course to which an embodiment of present disclosure is applied.

FIG. 16 is a diagram for explaining a clothing management course according to various embodiments of the present disclosure.

FIG. 16 illustrates that the AI processing for determining the weight of the clothing is performed in the stay stroke section, but is not limited thereto. As an example, the AI processing to determine the weight of the clothing based on the AI may be performed in one of the pre-steam stroke, steam stroke, stay stroke, cooling stroke, or drying stroke included in the clothing management course, and the AI processing may be performed repeatedly in a plurality of strokes if necessary.

In addition, FIG. 16 illustrates a section for controlling the vibration speed and vibration time of the moving hanger 260 based on the determined weight of the clothing as a drying stroke section, but is not limited thereto. As an example, the control related to the operation of the moving hanger 260 may be performed in one of the various clothing management courses described above or at least one of various clothing management courses described above.

Referring to the implementation example of FIG. 16, the processor 710 may predict the weight of the clothing in the stay stroke section. As described above with reference to FIG. 15, the stay stroke is a stroke section in which the fan 782 is rotated at a relatively low RPM. At the stay stroke, the movement of the clothing is relatively small, and thus, influence of external factors in predicting the weight of the clothing can be minimized.

As an example, the processor 710 may classify the weight of the clothing to correspond to class information including less than 1 kg, 1 kg, 2 kg, and 3 kg in the stay stroke section.

Thereafter, the processor 710 may perform different control operations based on the classification result in the drying stroke section. As an example, when the processor 710 is classified as less than 1 kg, the moving hanger 260 may be controlled at 160 cRPM for 20 minutes. As an example, when the processor 710 is classified as 1 kg, the moving hanger 260 may be controlled at 140 cRPM for 23 minutes. As an example, when the processor 710 is classified as 2 kg, the moving hanger 260 may be controlled at 120 cRPM for 27 minutes. As an example, when the processor 710 is classified as 3 kg, the moving hanger 260 can be controlled at 100 cRPM for 27 minutes.

The present disclosure described above can be embodied as computer readable codes on a medium in which a program is recorded. The computer-readable medium includes all kinds of recording devices in which data which can be read by a computer system is stored. Examples of the computer-readable media include a hard disk drive (HDD), a solid state disk (SSD), a silicon disk drive (SDD), a ROM, a RAM, a CD-ROM, a magnetic tape, a floppy disk, and an optical data storage device, and also include a media which are implemented in the form of a carrier wave (for example, transmission over the Internet). Accordingly, the above detailed description should not be construed as limiting in all respects, but should be considered illustrative. A scope of the present disclosure should be determined by the rational interpretation of the appended claims, and all changes within the equivalent scope of the present disclosure are included in the scope of the present disclosure.

Effects of the clothing management using the moving hanger according to an embodiment of the present disclosure are as follows.

According to the present disclosure, it is possible to perform the clothing management operation based on the weight of the clothing.

Moreover, it is possible to generate the predicted weight of the clothing using the hanger.

The effects which can be obtained from the present disclosure are not limited to the effects mentioned above, and other effects not mentioned will be clearly understood by a person skilled in the art to which the present disclosure belongs from the above descriptions.

What is claimed is:

1. A method of controlling a clothing styler comprising:
providing at least one pulse width modulation (PWM) value to a motor vibrating a moving hanger to determine a current RPM (cRPM) based on the PWM value;
generating predicted weight of clothing from an output value of a prediction model based on the determined cRPM applied to the prediction model, wherein the prediction model is a pre-trained artificial neural network; and
controlling a vibration speed and a vibration time in a clothing management course based on the predicted weight.

2. The method of controlling a clothing styler of claim 1, wherein the moving hanger is vibrated in one of a front-rear direction, an up-down direction, and a right-left direction based on driving of the motor.

3. The method of controlling a clothing styler of claim 1, wherein the least one PWM value is applied to the moving hanger during a preset time.

4. The method of controlling a clothing styler of claim 1, wherein the cRPM is an average RPM value of the cRPMs determined corresponding to the at least one PWM value.

5. The method of controlling a clothing styler of claim 1, wherein the cRPM is a feature vector which is generated corresponding to the at least one PWM value.

6. The method of controlling a clothing styler of claim 5, wherein a dimensional value of the feature vector is the same as the number of at least one PWM value.

7. The method of controlling a clothing styler of claim 1, wherein the prediction model is one of a regression model and a classification model.

8. The method of controlling a clothing styler of claim 1, further comprising:
generating the prediction model using a training dataset labeled with weight information of the clothing related to the cRPM.

9. The method of controlling a clothing styler of claim 1, wherein the clothing management course includes at least one of a pre-steam stroke, a steam stroke, a stay stroke, a cooling stroke, and a drying stroke.

10. The method of controlling a clothing styler of claim 9, wherein the predicting of the weight of the clothing is initiated in response to an end of the steam stroke.

11. The method of controlling a clothing styler of claim 10, wherein the vibration time is controlled to be increased in the drying stroke in proportion to the predicted weight.

12. The method of controlling a clothing styler of claim 11, when the vibration time reaches a preset specific value, the vibration time is controlled to be maintained at the specific value.

13. The method of controlling a clothing styler of claim 10, the vibration speed of the moving hanger in the drying stroke is controlled to be decreased in inverse proportion to the predicted weight.

14. A clothing styler comprising:
a communication module;
a memory; and
a processor which provides at least one pulse width modulation (PWM) value to a motor vibrating a moving hanger to determine a current RPM (cRPM) based on the PWM value, generate predicted weight of clothing from an output value of a prediction model based on the determined cRPM applied to the prediction model, wherein the prediction model is a pre-trained artificial neural network, and controls a vibration speed and a vibration time in a clothing management course based on the predicted weight.

15. The clothing styler of claim 14, wherein the moving hanger is vibrated in one of a front-rear direction, an up-down direction, and a right-left direction based on driving of the motor.

16. The clothing styler of claim 14, wherein the least one PWM value is applied to the moving hanger during a preset time.

17. The clothing styler of claim 14, wherein the cRPM is an average RPM value of the cRPMs determined corresponding to the at least one PWM value.

18. The clothing styler of claim 14, wherein the cRPM is a feature vector which is generated corresponding to the at least one PWM value.

19. The clothing styler of claim 18, wherein a dimensional value of the feature vector is the same as the number of at least one PWM value.

20. The clothing styler of claim 14, wherein the prediction model is one of a regression model and a classification model.

\* \* \* \* \*